United States Patent [19]

Yoshitake et al.

[11] Patent Number: 4,931,526

[45] Date of Patent: Jun. 5, 1990

[54] α-OLEFINIC RANDOM COPOLYMER AND PRODUCTION PROCESS THEREOF

[75] Inventors: Junichi Yoshitake, Ichihara; Hiroaki Kitani, Kuga; Takeshi Muranaka, Iwakuni; Akira Mizuno, Saeki; Norio Kashiwa, Iwakuni, all of Japan

[73] Assignee: Mitsui Petrochemical Industries, Ltd., Tokyo, Japan

[21] Appl. No.: 269,577

[22] Filed: Nov. 10, 1988

[30] Foreign Application Priority Data

Nov. 13, 1987 [JP] Japan ................... 62-285613

[51] Int. Cl.$^5$ ............................................. C08F 36/20
[52] U.S. Cl. ...................... 526/336; 526/124; 526/125; 526/335
[58] Field of Search ............. 526/336, 335, 124, 125

[56] References Cited

U.S. PATENT DOCUMENTS 3,984,610 10/1976 Elston ........................... 526/281 X
4,340,705 7/1982 Lal et al. ........................ 526/336 X
4,366,296 12/1982 Kitagawa et al. .............. 526/336 X

FOREIGN PATENT DOCUMENTS 0018737 11/1980 European Pat. Off. ............ 526/336
0219166 4/1987 European Pat. Off. ............ 526/336
0998690 7/1965 United Kingdom ................ 526/336

*Primary Examiner*—Joseph L. Schofer
*Assistant Examiner*—F. M. Teskin
*Attorney, Agent, or Firm*—Sherman and Shalloway

[57] ABSTRACT

An α-olefinic random copolymer containing an α-olefin component having 5 to 10 carbon atoms and an α,ω-nonconjugated diene component having 6 to 20 carbon atoms, and optionally, a straight α-olefin component having 2 to 20 carbon atoms, wherein the copolymer comprises:

(i) 70 to 99.9% by weight of a recurring unit (a) derived from the α-olefin, 0.1 to 30% by weight of a recurring unit (b) derived from the α,ω-nonconjugated diene and 0 to 20% by weight of a recurring unit (c) derived from the straight α-olefin component;

(ii) an inherent viscosity [$\eta$] measured in decalin at 135° C. of from 0.5 to 10 dl/g;

(iii) a crystallinity [Xc] measured by the X-ray diffraction method of from 0 to 50%;

(iv) a glass transition temperature [Tg] of from 30° to 60° C.; and (v) an iodine value of from 0 to 10.

4 Claims, No Drawings

α-OLEFINIC RANDOM COPOLYMER AND PRODUCTION PROCESS THEREOF

BACKGROUND OF THE INVENTION

1. Field of the Invention

The present invention relates to an α-olefinic random copolymer, preferably a branched α-olefinic random copolymer having a relatively low crystallinity, high glass transition temperature, improved moldability, and a superior vibration-damping performance at a high temperature. The present invention also relates to the process of production of the above-mentioned α-olefinic random copolymer.

2. Description of the Related Art

A large number of proposals have been made with regard to the production of branched α-olefinic polymers having a high crystallinity and a superior transparency and heat resistance by a polymerization or copolymerization of a branched α-olefin such as 4-methyl-1-pentene and 3-methyl-1-pentene in the presence of a stereoregular polymerizable Ziegler polymerization catalyst. These branched α-olefinic polymers are highly crystalline, and accordingly, have a high heat resistance, but have a poor moldability in that a large degree of warping and sinking occur when they are melt molded by, for example, injection molding or extrusion molding.

SUMMARY OF THE INVENTION

Accordingly, the objects of the present invention are to eliminate the above-mentioned disadvantages of the prior art and to provide an α-olefinic random copolymer having, for example, a high glass transition temperature and an improved melt moldability.

Another object of the present invention is to provide a process for producing the above-mentioned α-olefinic random copolymer.

Other objects and advantages of the present invention will be apparent from the following description.

In accordance with the present invention, there is provided an α-olefinic random copolymer comprising an α-olefin component having 5 to 10 carbon atoms, and preferably, having a branch at the 3-position or higher, an α,ω-nonconjugated diene component having 6 to 20 carbon atoms, and optionally, a straight α-olefin component having 2 to 20 carbon atoms, wherein the copolymer comprises:

(i) 70 to 99.9% by weight of a recurring unit (a) derived from the α-olefin, 0.1 to 30% by weight of a recurring unit (b) derived from the α,ω-nonconjugated diene, and optionally, 0 to 20% by weight of a recurring unit (c) derived from the straight α-olefin component;

(ii) an inherent viscosity $[\eta]$ measured in decalin at 135° C., of from 0.5 to 10 dl/g;

(iii) a crystallinity [Xc] measured by an X-ray diffraction method, of from 0 to 50%;

(iv) a glass transition temperature [Tg] of from 30° to 60° C.; and (v) an iodine value of from 0 to 10.

In accordance with the present invention, there is also provided a process for producing an α-olefinic random copolymer, which comprises copolymerizing an α-olefin having 5 to 10 carbon atoms, and preferably, having a branch at the 3-position or higher, an α,ω-nonconjugated diene component having 6 to 20 carbon atoms, and optionally, a straight α-olefin having 2 to 20 carbon atoms, in the presence of a catalyst formed from:

(A) a highly active and extremely stereoregular titanium catalyst component containing magnesium, titanium, a halogen, and an electron donor as essential components;

(B) an organic aluminum compound catalyst component; and (C) an electron donor, whereby an α-olefinic random copolymer comprising 70 to 99.9% by weight of a recurring unit (a) derived from the α-olefin, 0.1 to 70% by weight of a recurring unit (b) derived from the α,ω-nonconjugated diene, and 0 to 20 mol % of a recurring unit (C) derived from the straight α-olefin, and having (i) an intrinsic viscosity $[\eta]$ measured in decalin at 135° C. of from 0.5 to 10 dl/g, (ii) a crystallinity [Xc] measured by an X-ray diffraction method of from 0 to 50%, (iii) a glass transition temperature [Tg] of from 30 to 60° C., and (iv) an iodine value of from 0 to 10, is produced.

DESCRIPTION OF THE PREFERRED EMBODIMENTS

The α-olefinic random copolymer of the present invention has the specific features of possessing a high glass transition temperature and a high heat resistance, although having a relatively low crystallinity, but nonetheless has a remarkably smaller warping and sinking during a melt molding process such as injection molding or extrusion molding. Further, the α-olefinic random copolymer of the present invention has a peculiarity of being able to provide a superior vibration-damping performance, particularly at high temperature, and therefore, is suitable for use as a base material for vibration-damping materials.

The α-olefinic random copolymer of the present invention is an α-olefinic random copolymer comprising an α-olefinic component having 5 to 10 carbon atoms, and preferably, having a branch at the 3-position or higher, an α,ω-nonconjugated diene component having 6 to 20 carbon atoms, and optionally, a straight α-olefinic component having 2 to 20 carbon atoms. More specifically, the α-olefinic random copolymer of the present invention may be a binary copolymer comprising an α-olefinic component having 5 to 10 carbon atoms, and preferably, having a branch at the 3-position or higher and an α,ω-nonconjugated diene component having 6 to 20 carbon atoms, and further, a ternary random copolymer comprising an α-olefinic component having 5 to 10 carbon atoms, and preferably, having a branching at the 3-position or higher, an α,ω-nonconjugated diene component having 6 to 20 carbon atoms, and a straight α-olefin component having 2 to 20 carbon atoms, as desired.

The composition of the branched random copolymer of the present invention comprises 70 to 99.9% by weight, preferably 75 to 99.5% by weight, more preferably 80 to 99% by weight of the recurring unit (a) derived from the α-olefin, 0.1 to 30% by weight, preferably 0.5 to 25% by weight, more preferably 1 to 20% by weight of the recurring unit (b) derived from the α,ω-nonconjugated diene, and 0 to 20% by weight, preferably 0 to 15% by weight, more preferably 0 to 10% by weight of the recurring unit (c) derived from the straight α-olefin. The copolymer composition is determined according to the $^{13}C$ NMR method. If the content of the recurring unit (b) derived from the α,ω-nonconjugated diene is smaller than 0.1% by weight, the melt moldability defects such as warping and sinking cannot be completely eliminated, and the superior vibration-damping performance is not fully exhibited. On the other hand, if the content of the recurring unit (b) derived from the α,ω-conjugated diene is more than 20% by weight, the glass transition temperature (Tg) is lowered, and thus the heat resistance is lowered.

The α-olefinic random copolymer of the present invention has an intrinsic viscosity [η] as measured in decalin at 135° C. of from 0.5 to 10 dl/g, preferably from 0.7 to 9 dl/g, more preferably from 1 to 7 dl/g. If the intrinsic viscosity of the present copolymer is less than 0.5 dl/g, the mechanical properties of the molded product will be lowered, and the intrinsic viscosity thereof is more than 10 dl/g, the moldability will be lowered.

The α-olefinic random copolymer of the present invention has a crystallinity [Xc] as measured by the X-ray diffraction method of from 0 to 50%, preferably from 0 to 40%, more preferably from 0 to 35%. The crystallinity is determined by an X-ray diffraction measurement of a 1 mm thick pressed sheet 20 hours after molding. If the crystallinity is more than 50%, the melt moldability defects such as warping and sinking cannot be completely eliminated, and further, the superior vibration-damping performance is not fully exhibited.

The α-olefinic random copolymer of the present invention has a glass transition temperature [Tg] as measured by a dynamic viscosity measuring device of from 30° to 60° C., preferably from 35 to 60° C., more preferably from 40° to 60° C. The glass transition temperature is measured by taking a 0.5 mm thick sheet, 20 hours after molding, and measuring the dynamic viscosity characteristics thereof under the conditions of a frequency of 110 Hz and a temperature elevation rate of 2° C./min., wherein the tan-δ peak is defined as the Tg. If the glass transition temperature is lower than 30° C., the heat resistance is deficient, but preparation of a copolymer having a glass transition temperature higher than 60° C. is difficult.

The α-olefinic random copolymer of the present invention has an iodine value of 0 to 10, preferably 0 to 8, more preferably 0 to 5. If the iodine value is greater than 10, the weathering resistance is lowered.

The α-olefinic random copolymer of the present invention has a density of from 0.83 to 0.87 g/cm$^3$.

The α-olefinic random copolymer of the present invention has a melting point as measured by a differential scanning calorimeter of 230° C. or lower, preferably 220° C. or lower, more preferably 210° C. or lower (DSC melting point). The DSC melting point is measured by using a 1 mm thick pressed sheet 20 hours after molding at a temperature elevation rate of 10° C./min. from 0° to 250° C., and the maximum heat absorption peak is defined as Tm.

The Haze value of the 1 mm thick sheet of the α-olefinic random copolymer of the present invention is usually 30 or less, preferably 20 or less, more preferably 10 or less. The Haze value is measured by the method of JIS K7105, 20 hours after molding, using a 1 mm thick pressed sheet molded according to JIS K6758 at a heating temperature of 250° C.

The content of the solubles in the α-olefinic random copolymer of the present invention in acetone-n-decane solvent mixture (volume ratio 1/1) is 10% by weight or less, preferably 7% by weight or less, more preferably 5% by weight or less. The content of the solubles in the copolymer in the solvent mixture is determined by a measurement according to the following method.

Namely, 1 g of the copolymer sample, 0.05 g of 2,6-di-tert-butyl-4-methylphenol and 50 ml of n-decane are charged into a 150 ml flask equipped with a stirring blade, to dissolve the copolymer on an oil bath at 120° C. The resultant solution is cooled under room temperature for 30 minutes, 50 ml of acetone added over 30 seconds, and the mixture then cooled on a water bath at 10° C. for 60 minutes. The copolymer precipitate and the solution containing low molecular weight components dissolved therein are separated by filtration with a glass filter, the solution dried to a constant weight at 150° C. under 10 mmHg, and the weight thereof measured. The content of the solubles in the copolymer in the above solvent mixture is determined by calculation as a percentage based on the weight of the sample copolymer. In the above measurement method, stirring is conducted continuously from dissolution to immediately before filtration. If the content of solubles is more than 10% by weight, the surface tackiness and blocking become greater.

The glass transition temperature (Tg) and the crystallinity (B) of the α-olefinic random copolymer of the present invention satisfy the relationship:

Tg ≧ 15 + 0.83 B, preferably Tg ≧ 20 + 0.83 B.

The recurring unit (a) derived from the α-olefin in the α-olefinic random copolymer of the present invention is represented generally by:

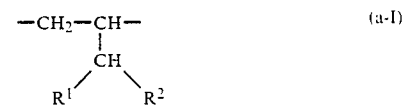

wherein $R^1$ and $R^2$ may be identical or different and each represents hydrogen, or an alkyl group having 1 to 7 carbon atoms, with proviso that the sum of the carbon atoms of $R^1$ and $R^2$ is 2 to 7; the recurring unit (b) derived from α,ω-nonconjugated diene is represented generally by:

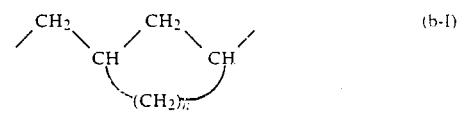

and/or

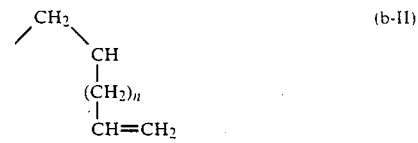

wherein 2 ≦ n ≦ 16; and, the recurring unit (c) derived from the straight α-olefin is represented generally by:

wherein $R^3$ represents a hydrogen atom or a straight alkyl group having 1 to 18 carbon atoms, and the respective units are randomly arranged to form a substantially linear structure. The structure of these respective units can be confirmed by $^{13}C$-NMR analysis and IR analysis. A substantially linear structure denotes that a network crosslinked structure is not included, although a branched structure may be formed. The forming of a linear structure by the α-olefinic random copolymer of the present invention can be confirmed by determining whether the copolymer is completely dissolved in decalin at 135° C., and thus does not contain a gel-like crosslinked polymer.

The highly active and extremely stereoregular solid titanium catalyst component (A) contains magnesium, titanium, a halogen, and an electron donor as the essential components, wherein the magnesium/titanium atomic ratio is greater than 1, preferably 3 to 50, more preferably 6 to 30, a halogen/titanium having an atomic ratio of preferably 4 to 100, more preferably 6 to 40, and an electron donor/titanium having a molar ratio of preferably 0.1 to 10, more preferably 0.2 to 6. The specific surface area thereof is preferably 3 $m^2/g$ or more, more preferably 40 $m^2/g$ or more, most preferably 100 $m^2/g$ to 800 $m^2/g$. In general, the titanium compound is not eliminated by a simple means such as washing with hexane, and an X-ray spectrum thereof shows that the magnesium compound is finely crystallized regardless of the kind of starting magnesium compound used for the catalyst preparation, or is desirably very finely crystallized compared with conventional commercially available magnesium halide products. In addition to the above essential components, other elements, metals, and functional groups may be contained, and further, the catalyst may be diluted with an organic or inorganic diluent.

The solid titanium catalyst component (A) has an average particle size of 1 to 200μ, preferably 3 to 100μ, particularly preferably 6 to 50μ, wherein the geometrical standard deviation of the particle size distribution is less than 2.1, preferably 1.9 or less, more preferably 1.7 or less.

The particle size distribution of the titanium catalyst component particles can be measured by the light transmission method. More specifically, the catalyst component is diluted to a concentration of 0.01 to 0.5% in an inert solvent such as decalin, placed in a cell for measurement, the cell is irradiated with a fine light, and the intensity of the light passing through the liquid under a predetermined sedimentation state of the particles is measured continuously to determine the particle size distribution. The standard deviation $\sigma g$ can be determined from the logarithmic normal distribution function on the basis of the particle size distribution. The average particle size of the catalyst is represented by the weight average particle size, and measurement of the particle size distribution is performed by calculation by sieving particles having a size of from 10 to 20% of the weight average molecular size.

The solid titanium catalyst component (A) can produce an extremely stereoregular polymer at a high efficiency, and preferably has spherical shape such as a true spheriod, an ellipsoid, or a granular shape.

The use of the titanium catalyst component satisfying the above conditions allows the copolymer of the present invention to be produced with a good operability and at a high yield.

The titanium catalyst component (A) which satisfies all of the above conditions can be obtained by, for example, the method in which a magnesium compound having an average particle size and particle size distribution, more preferably the shape within the range as described above, is formed followed by catalyst preparation, or the method in which the solid catalyst is formed by bringing a liquid magnesium compound into contact with a liquid titanium compound to obtain the particle properties as described above. Such methods are disclosed, for example, in Japanese Unexamined Patent Publications (Kokai) Nos. 55-135102, 55-135103, 56-811, 56-67311 and 58-83006.

Examples of these methods are now briefly described.

(1) A magnesium compound-electron donor complex having an average particle size of 1 to 200μ and a geometrical standard deviation of particle size distribution $\sigma g$ of less than 2.1 is pre-treated with a reaction aid such as an electron donor and/or an organic aluminum compound or a halo-containing silicon compound, or is not pre-treated, and is reacted with a halogenated titanium compound which forms a liquid phase under the reaction conditions, i.e., preferably titanium tetrachloride.

(2) A liquid magnesium compound not having a reducing ability and a liquid titanium compound are reacted with each other in the presence of an electron donor to precipitate a solid component having an average particle size of 1 to 200μ, and a geometrical standard deviation of particle size distribution $\sigma g$ of less than 2.1. If necessary, the compound is further reacted with a liquid titanium compound, preferably titanium tetrachloride, or an electron donor together therewith.

In the present invention, particularly good results can be obtained when a magnesium compound-electron donor complex precipitated as spherical solid from the liquid compound is used in the method (1), or when precipitation of the solid component is effected under conditions such that a spherical solid is precipitated in the method (2).

Examples of the magnesium compound to be used in the preparation of the titanium catalyst component include magnesium oxide, magnesium hydroxide, hydrotalsite, carboxylates of magnesium, alkoxymagnesium, allyloxymagnesium, alkoxymagnesium halide, allyloxymagnesium halide, magnesium dihalide, organic magnesium compound, reaction products of organic magnesium compound with an electron donor, halosilane, alkoxysilane, silanol, and aluminum compound. The organic aluminum compound which used in the preparation of the above titanium catalyst component can be selected from among organic aluminum compounds which can be used in the olefin polymerization as described below. Further, examples of the halo-containing silicon compounds which may be used in the preparation of the titanium catalyst component include silicon tetrahalide, alkoxy silicon halide, alkyl silicon halide, and halopolysiloxane.

Examples of the titanium compound to be used in the preparation of the titanium catalyst component include titanium tetrahalide, alkoxy titanium halide, allyloxy titanium halide, alkoxy titanium, and allyloxy titanium; preferably titanium tetrahalide, and most preferably, titanium tetrachloride.

As the electron donor used in the preparation of the titanium catalyst component, there can be used oxygen-containing electron donors such as alcohols, phenols, ketones, aldehydes, carboxylic acids, esters of organic acids or inorganic acids, ethers, acid amides, alkoxysilanes of acid anhydrides, nitrogen-containing electron donors such as ammonia, amines, nitriles, and isocyanates.

More specifically, there can be included alcohols having 1 to 18 carbon atoms, such as methanol, ethanol, propanol, pentanol, hexanol, octanol, dodecanol, octadecyl alcohol, benzyl alcohol, phenylethyl alcohol, cumyl alcohol, and isopropylbenzyl alcohol, or the like; phenols having 6 to 20 carbon atoms which may have lower alkyl groups such as phenol, cresol, xylenol, ethylphenol, propylphenol, nonylphenol, cumylphenol, and naphthol or the like; ketones having 3 to 15 carbon atoms such as acetone, methyl ethyl ketone, methyl isobutyl ketone, acetophenone, and benzophenone or the like; aldehydes having 2 to 15 carbon atoms such as acedaldehyde, propionaldehyde, octylaldehyde, benzaldehyde, tolualdehyde, and naphthoaldehyde or the like; organic acid esters having 2 to 30 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, ethyl anisate, ethyl ethoxybenzoate, dibutyl malonate, diethyl iso propylmalonate, diethyl n-butylmalonate, diethyl phenylmalonate, diethyl 2-allylmalonate, diethyl di-iso-butylmalonate, diethyl di-n-butylmalonate, di-n-butyl succinate, diethyl methylsuccinate, dibutyl ethylsuccinate, dimethyl maleate, dibutyl maleate, monooctyl maleate, dioctyl maleate, dibutyl butylmaleate, diethyl butylmaleate, di-iso-octyl fumarate, diethyl itaconate, di-n-butyl itaconate, dimethyl citraconate, diethyl-1,2-cyclohexanedicarboxylate, 2-ethylhexyl-1,2-cyclohexanedicarboxylate, dimethyl phthalate, mono-isobutyl phthalate, diethyl phthalate, ethyl n-butyl phthalate, di-n-propyl phthalate, n-butyl phthalate, iso-butyl phthalate, di-n-heptyl phthalate, di-2-ethylhexyl phthalate, di-n-octyl phthalate, dineopentyl phthalate, benzyl butyl phthalate, diphenyl phthalate, di-iso-butyl naphthalenedicarboxylate, di-2-ethylhexyl sebacate, γ-butyrolactone, δ-valerolactone, coumarine, phthalide, and ethylene carbonate or the like; acid halides having 2 to 15 carbon atoms such as acetyl chloride, benzoyl chloride, toluylic acid chloride, and anisic acid chloride or the like; ethers having 2 to 20 carbon atoms such as methyl ether, ethyl ether, isopropyl ether, butyl ether, isoamyl ether, tetrahydrofuran, anisole, and diphenyl ether or the like; acid amides such as acetic acid amide, benzoic acid amide, and toluylic acid amide or the like; amines such as methylamine, ethylamine, diethylamine, tributylamine, piperidine, tribenzylamine, aniline, pyridine, picoline, tetramethylmethylenediamine, and tetramethylethylenediamine or the like; nitriles such as acetonitrile, benzonitrile, and tolunitrile or the like; organic phosphorus compounds having a P—O—C bond, such as trimethyl phosphite and triethyl phosphite or the like; and alkoxysilanes such as ethyl silicate and diphenyldimethoxysilane, or the like. These electron donors can be used in a combination of two or more kinds thereof.

The electron donor desirably contained in the titanium catalyst component (A) is one not having an active hydrogen, such as esters of organic acids or inorganic acids, alkoxy (aryloxy) silane compounds, ethers, ketones, tertiary amines, acid halides, acid anhydrides, preferably organic acid esters or alkoxy (aryloxy) silane compounds, and most preferably, esters of aromatic monocarboxylic acids with alcohols having 1 to 8 carbon atoms, esters of dicarboxylic acids such as malonic acid, substituted malonic acid, substituted succinic acid, maleic acid, substituted maleic acid, 1,2-cyclohexanedicarboxylic acid, and phthalic acid or the like with alcohols having 2 or more carbon atoms. Note, these electron donors need not be used as the starting material during the preparation of the titanium catalyst, and compounds convertible to these electron donors can be used and converted to these electron donors during the catalyst preparation.

The titanium catalyst component obtained by the methods described above can be purified after completion of the reaction by thoroughly washing with a liquid inert hydrocarbon. Examples of the inert liquid hydrocarbon to be used include aliphatic hydrocarbons such as n-pentane, iso-pentane, n-hexane, iso-hexane, n-heptane, n-octane, iso-octane, n-decane, n-dodecane, kerosene, and fluid paraffins; alicyclic hydrocarbons such as cyclopentane, methylcyclopentane, cyclohexane, and methylcyclohexane; aromatic hydrocarbons such as benzene, toluene, xylene, and cymene; halogenated hydrocarbons such as chlorobenzene and dichloroethane; or mixtures thereof.

Preferably, the organic metal compound catalyst component (B) used in the present invention is an organic aluminum compound, and compounds having at least one Al-carbon bond in the molecule can be utilized, as exemplified by (i) the aluminum compounds represented by the formula $R^1{}_m Al(OR^2)_n H_p X_q$ (wherein $R^1$ and $R^2$ are each a hydrocarbon group containing generally 1 to 15, preferably 1 to 4 carbon atoms, which may be either identical or different; X is a halogen, m is $0 < m \leq 3$, n is $0 \leq n < 3$, p is $0 \leq p < 3$, q is $0 \leq q < 3$, and further, $m+n+p+q=3$), and (ii) the complex alkylated compounds with the group I metal and aluminum represented by the formula $M^1 AlR^1{}_4$ (wherein $M^1$ is Li, Na, and K and $R^1$ is the same as defined above).

As the organic aluminum compounds belonging to the above (i), the following compounds may be exemplified; namely, the compounds of the formula $R^1{}_m Al(OR^2)_{3-m}$ (wherein $R^1$ and $R^2$ are the same as defined above, and m is preferably of $1.5 \leq m \leq 3$); the compounds of the formula $R^1{}_m Al_{3-m}$ (wherein $R^1$ is the same as defined above, X is a halogen, and m is preferably $0 < m < 3$); the compounds of the formula $R^1{}_m AlH_{3-m}$ (wherein $R^1$ is the same as defined above, and m is preferably $2 \leq m < 3$); and the compounds of the formula $R^1{}_m Al(OR^2)_n X_q$ (wherein $R^1$ and $R^2$ are the same as defined above, X is a halogen, $0 < m3$, $0 \leq n < 3$, $0 \leq q < 3$, and $m+n+q=3$).

More specifically, in the aluminum compounds belonging to (i) there may be included trialkylaluminum such as triethylaluminum and tributylaluminum or the like; trialkenylaluminum such as triisoprenylaluminum or the like; dialkylaluminumalkoxyide such as diethylaluminumethoxide and dibutylaluminumbutoxide or the like; alkylaluminum sesquialkoxide such as ethylaluminum sesquiethoxide, and butylaluminum sesquialkoxide or the like; and alternatively, alkylaluminum partially alkoxylated having an average composition represented by $R^1{}_{2.5} Al(OR^2)_{0.5}$; partially halogenated alkylaluminum including a dialkylaluminum halide such as diethylaluminum chloride, dibutylaluminum chloride, and diethylaluminum bromide; alkylaluminum sesquihalide such as ethylaluminum sesquichloride, butylaluminum sesquichloride, and ethylaluminum sesquibromide; alkylaluminum dihalide such as ethylaluminum dichloride, propylaluminum dichloride, and butylaluminum dibromide or the like; partially hydrogenated alkyl aluminum including a dialkylaluminum hydride such as diethylaluminum hydride and dibutylaluminum hydride or the like; alkyl aluminum dihyride such as ethylaluminum dihydride and propylaluminum dihydride or the like; and partially alkoxylated and halogenated alkyl aluminum such as ethylaluminumethoxy chloride, butylaluminumbutoxy chloride, and ethylaluminum ethoxybromide or the like. As the compounds analogous to (i), organic aluminum compounds having 2 or more aluminum atoms bonded through an oxygen atom or nitrogen atom may be employed. Examples of such compounds include:

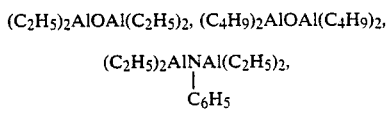

As the compound belonging to the above (ii), LiAl($C_2H_5$)$_4$ and LiAl($C_7H_{15}$)$_4$ can be exemplified, and among the above, particularly preferably a trialkylaluminum or a mixture of a trialkylaluminum with an alkylaluminum halide or an aluminum halide is used.

Examples of the electron donor to be used as the catalyst component (c) include amines, amides, ethers, ketones, nitriles, phosphines, stibines, arsines, phosphoroamides, esters, thioethers, thioesters, acid anhydrides, acid halides, aldehydes, alcholates, alkoxy (aryloxy) silanes, organic acids, and amides and salts of the metals belonging to the group I to IV of the periodic table. The salts can be also formed in situ through a reaction of organic acids and the organic metal compounds to be used as the catalyst component (B).

Specific examples thereof can be selected from, for example, those exemplified as electron donors to be contained in the titanium catalyst component (A). Good results can be obtained when organic acid esters, alkoxy (aryloxy) silane compounds, ethers, ketones, acid anhydrides, and amines are employed. Particularly, when the electron donor in the titanium catalyst component (A) is a monocarboxylic acid ester, the electron donor as the component (c) is preferably an alkyl ester of an aromatic carboxylic acid.

When the electron donor in the titanium catalyst component (A) is an ester of a dicarboxylic acid exemplified previously as preferable, with an alcohol having 2 or more carbon atoms, preferably an alkoxy (aryloxy) silane compound represented by the formula $R_nSi(OR^1)_{4-n}$ (wherein R, $R^1$ are hydrocarbon groups, $0 \leq n < 4$) or an amine with a large steric hindrance as the component (c) is used. Specific examples of the above alkoxy (aryloxy) silane compound include trimethylmethoxysilane, trimethylethoxysilane, dimethyldimethoxysilane, dimethyldiethoxysilane, dimethyldimethoxysilane, dimethyldiethoxysilane, diphenyldimethoxysilane, methylphenyldimethoxysilane, diphenyldiethoxysilane, ethyltrimethoxysilane, vinyltrimethoxysilane, methyltrimethoxysilane, phenyltrimethoxysilane, γ-chloropropyltrimethoxysilane, methyltriethoxysilane, ethyltriethoxysilane, vinyltriethoxysilane, butyltriethoxysilane, phenyltriethoxysilane, γ-aminopropyltriethoxysilane, chlorotriethoxysilane, ethyltriisopropoxysilane, vinyltributoxysilane, ethyl silicate, butyl silicate, trimethylphenoxysilane, methyltriallyloxysilane, vinyl tris(β-methoxyethoxysilane), vinyltriacetoxysilane, and dimethyltetra-ethoxydisiloxane or the like, particularly preferably methyltrimethoxysilane, phenyltrimethoxysilane, methyltriethoxysilane, ethyltriethoxysilane, vinyltriethoxysilane, phenyltriethoxysilane, vinyltributoxysilane, diphenyldimethoxysilane, methylphenyldimethoxysilane, diphenyldiethoxysilane, and ethyl silicate.

As the amine with a large steric hindrance as mentioned above, 2,2,6,6-tetramethylpiperidine and 2,2,5,5-tetramethylpyrrolidine, or derivatives thereof, and tetramethylmethylenediamine, are particularly preferred.

The branched α-olefinic random copolymer of the present invention is produced by copolymerizing a branched α-olefin having 5 to 10 carbon atoms and a branch at the 3-position or higher, an α,ω-nonconjugated diene having 6 to 20 carbon atoms, and optionally, a straight α-olefin having 2 to 20 carbon atoms, in the presence of a catalyst formed from the above titanium catalyst component (A), the above organic metal compound catalyst component (B), and the above electron donor catalyst component (C) in an inert hydrocarbon solvent or without the use of a solvent. The proportions of the branched α-olefin, the nonconjugated diene, and the straight α-olefin during copolymerization are generally 70 to 99.9% by weight, preferably 75 to 99.9% by weight for the branched α-olefin, 0.1 to 30% by weight, preferably 0.1 to 25% by weight for the nonconjugated diene, and 0 to 20% by weight, preferably 0 to 15% by weight for the straight γ-olefin.

In the process of the present invention, the copolymerization reaction can be conducted in either a liquid or a gas phase, but is preferably conducted under conditions in which the copolymer forms a suspension in a liquid phase.

When the copolymerization is conducted in the liquid phase, an inert solvent such as hexane, heptane, and kerosene may be used as the reaction medium, but an olefin itself also can be used as the reaction medium. The proportion used of the catalyst is 0.001 to 500 mmol, particularly preferably 0.005 to 200 mmol, of the titanium catalyst component (A) as calculated on titanium atoms per one liter of the reaction volume, and the organic aluminum compound (B) is preferably used at a ratio of Al/Ti (atomic ratio) of 0.1 to 1000, particularly 0.5 to 500. The catalyst component (C) may be carried on the component (A), or may be added to a part of the component (B), or alternatively may be added under a free state to the polymerization system. Note, the catalyst component (C) should be present in an amount of about 0.1 to 200 mols, particularly 0.2 to 50 mols per one mol of titanium atom.

The copolymerization temperature is preferably about 20° to about 200° C., more preferably about 50° to about 180° C., and the pressure is preferably from atmospheric pressure to about 100 kg/cm², more preferably about 2 to about 50 kg/cm².

The molecular weight can be controlled to some extent by varying the polymerization conditions such as the polymerization temperature and the ratios of the catalyst components used, and addition of hydrogen to the polymerization system is most effective for this purpose.

Examples of the inert hydrocarbon solvent to be used in copolymerization include aliphatic hydrocarbons such as propane, butane, n-pentane, iso-pentane, n-hexane, iso-hexane, n-heptane, n-octane, iso-octane, n-decane, n-dodecane, kerosene, and others; alicyclic hydrocarbons such as cyclopentane, methylcyclopentane, cyclohexane, and methylcyclohexane; aromatic hydrocarbons such as benzene, toluene, and xylene; and halogenated hydrocarbons such as methylene chloride, ethyl chloride, ethylene chloride, and chlorobenzene. Among the above, aliphatic hydrocarbons, particularly aliphatic hydrocarbons having 4 to 10 carbon atoms, are preferred.

The α-olefin component to be used as the polymerization starting material in the process of the present invention is an α-olefin having 5 to 10 carbon atoms and, preferably, having a branch at the 3-position or higher, including, specifically, 3-methyl-1-butene, 4-methyl-1-pentene, 3-methyl-1-pentene, 4-methyl1-hexene, 3-methyl-1-hexene, 4-methyl-1-octene, 3-methyl-1-octene, and 4-methyl-1-nonene.

The α,ω-nonconjugated diene to be used as the polymerization starting material in the process of the present invention is an α,ω-nonconjugated diene component having 6 to 20 carbon atoms, including, specifically, 1,5-hexadiene, 1,6-heptadiene, 1,7-octadiene, 1,8-nonadiene, 1,9-decadiene, 1,11-dodecadiene, 1,13-tetradecadiene, 1,15-hexadecadiene, 1,17-octadecadiene, and 1,19-eicodiene.

The straight α-olefin component optionally used as the polymerization starting material in the process of the present invention is a straight α-olefin component having 2 to 20 carbon atoms including, specifically, ethylene, propylene, 1-butene, 1-hexene, 1-octene, 1-decene, 1-dodecene, 1-tetradecene, 1-hexadecene, 1-octadecene, and 1-eicosene.

In the process of the present invention an α-olefin, an α,ω-nonconjugated diene, and optionally, a straight α-olefin are copolymerized by selecting the suitable conditions from among those described above, and during the copolymerization, the proportions of the polymerization starting materials fed are controlled so that the recurring unit (a) derived from the branched α-olefin, the recurring unit (b) derived from the α,ω-nonconjugated diene, and the recurring unit (c) derived from the straight α-olefin become the respective compositions as specified above to effect copolymerization and give an inherent viscosity $[\eta]$ as measured in decaline at 135° C. in the range specified above, whereby the α-olefinic random copolymer of the present invention can be obtained.

The α-olefinic random copolymer of the present invention has a relatively lower crystallinity compared with a homopolymer of a branched α-olefin, but has specific features of a higher glass transition temperature, an excellent heat resistance, and a remarkable elimination of warping and sinking occurring during a melt molding such as injection molding and extrusion molding. Further, the branched α-olefinic random copolymer of the present invention has a superior vibration-damping performance, particularly at a high temperature, and therefore, is suitable as a vibration-damping material.

EXAMPLES

The present invention will now be further illustrated by, but is by no means limited to, the following Examples.

EXAMPLE 1

Preparation of titanium catalyst component (A)

After 4.76 g (50 mmol) of anhydrous magnesium chloride, 25 ml of decane and 23.4 ml (150 mmol) of 2-ethylhexyl alcohol were subjected to a heat reaction at 130° C. for 2 hours to form a uniform solution, 1.11 g (7.5 mmol) of phthalic anhydride was added to the solution, followed by mixing under stirring at 130° C. for one hour, to dissolve phthalic anhydride in the uniform solution. The uniform solution thus obtained was cooled to room temperature and then charged by adding the whole amount dropwise into 200 ml (1.8 mol) of titanium tetrachloride maintained at −20° C., over one hour. After completion of the charging, the temperature of the mixture was elevated over 4 hours, and when the temperature reached 110° C., 2.68 ml (12.5 ml) of diisobutyl phthalate was added and the mixture was thereafter maintained at the same temperature under stirring for 2 hours. After completion of the reaction for 2 hours, the solid portion was collected by hot filtration and resuspended with 200 ml of TiCl₄, and the heat reaction was again carried out at 110° C. for 2 hours. After completion of the reaction, the solid portion was again collected by hot filtration, and thoroughly washed with decane and hexane at 110° C. until free titanium was not detected in the washing waste. The titanium catalyst component (A) synthesized by the preparation method described above was stored as hexane slurry, and a part thereof was dried to enable an examination of the catalyst composition. The titanium catalyst component (A) had a composition of 3.1% by weight of titanium, 56.0% by weight of chlorine, 17.0% by weight of magnesium, and 20.9% by weight of diisobutyl phthalate.

Polymerization

Into a one liter autoclave were added 500 ml of

Into a one liter autoclave were added 500 ml of 4-methyl-1-pentene, 4.9 ml of 1,5-hexadiene, 1 mmol of triethylaluminum, 1 mmol of trimethylmethoxysilane, and 0.005 mmol of the titanium catalyst component in terms of titanium atom, and polymerization was carried out at 50° C. for 12 minutes. The polymerization was then stopped by an addition of methanol, and the whole amount of the polymer was precipitated in a large amount of methanol and separated by filtration. followed by drying. The polymerization results and the results of the measurements of physical properties are shown in Table 1. In the copolymer, from the result of 13C-NMR, it was confirmed that the recurring units derived from the 1,5-hexadiene component formed the structure:

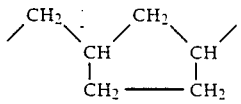

and 99% or more of the 1,5-hexadiene component formed this ring structure. Thus, in the copolymer of 1,5-hexadiene and 4-methylpentene-1, 1,5-hexadiene is cyclized to form the following structure. This is suggested because this copolymer does not have the absorption at 910 cm¹ and 990 cm¹ inherent in terminal vinyl, and that a peak of carbon participating in a double bond is not recognized in ¹³C-NMR, and further, the respective peaks on the ¹³C-spectrum were attributed as follows, with the TMS standard from the higher magnetic field side:

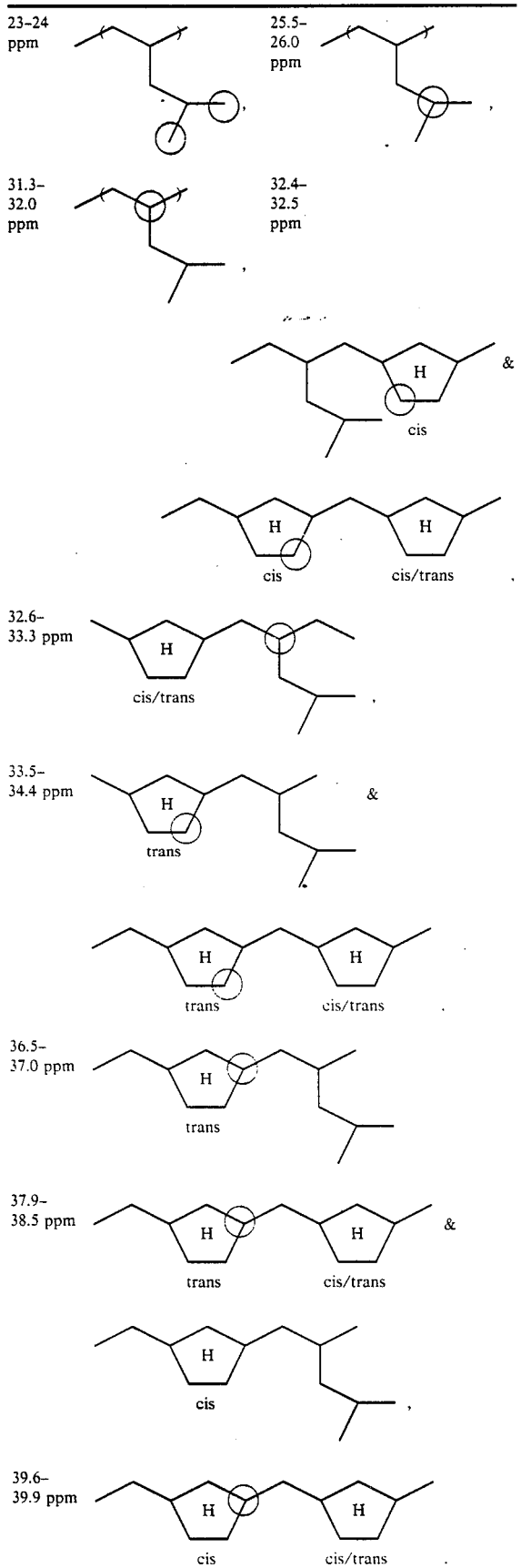

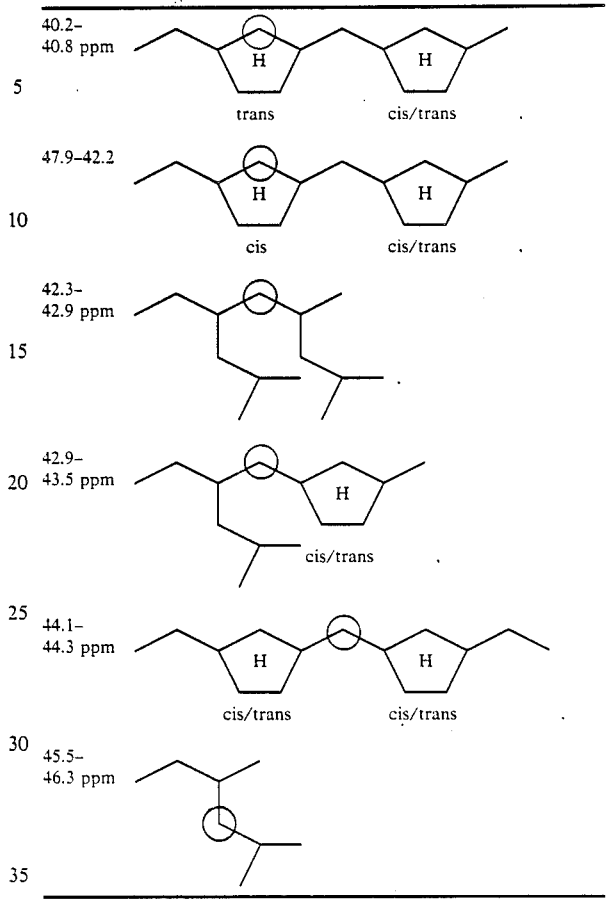

Therefore, this copolymer was confirmed to have the structure:

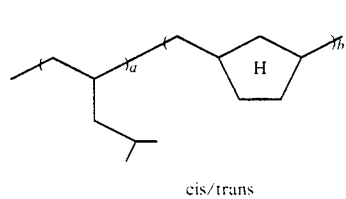

cis/trans

EXAMPLES 2–4

Polymerization was carried out in the same manner as in Example 1 except that the amount of catalyst component used, the amount of 1,5-hexadiene used, and the polymerization temperature and time were varied as shown in Table 1. The results of the polymerization and the analytical results are shown in Table 1. In the obtained copolymers, it was confirmed, as in Example 1, from the results of 13C-NMR analysis and IR analysis that the recurring units derived from 1,5-hexadiene were:

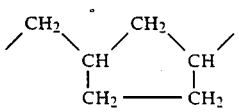

and that 99% or more of the 1,5-hexadiene component formed this cyclic structure.

EXAMPLE 5

Polymerization was carried out in the same manner as in Example 1 except that a small amount of dodecene (α-olefin) was added in addition to 4-methyl-1-pentene (branched α-olefin) and 1,5-hexadiene (α,ω-nonconjugated diene) and the conditions shown in Table 1 were used. The results are shown in Table 1. In the obtained copolymer, it was confirmed, as in Example 1, from the results of $^{13}$C-NMR analysis and IR analysis that the recurring units derived from 1,5-hexadiene were:

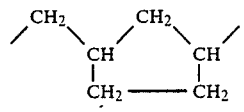

and that 99% or more of the 1,5-hexadiene component formed this cyclic structure. The content of 4-methyl-1-pentene component in the copolymer was found to be 95.2% by weight, and the content of 1-decene component was 3.5% by weight.

EXAMPLES 6-8

Polymerization was carried out in the same manner as in Example 1 except that 1,7-octadiene or 1,6-heptadiene was used as the α,ω-nonconjugated diene and the conditions shown in Table 1 were used. The results are shown in Table 1. In the obtained copolymers, it was confirmed from $^{13}$C-NMR analysis and IR analysis that 33% of the recurring units derived from 1,7-octadiene were:

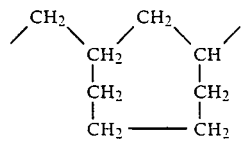

and the remaining 67% formed a vinyl structure of:

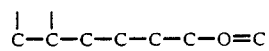

Examples 6 and 7), and the recurring units derived from 1,6-heptadiene were:

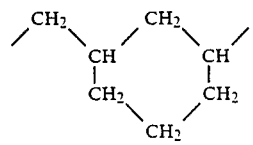

and 95% or more of 1,6-heptadiene component formed this cyclic structure (Example 8).

Comparative Example 1

In Example 1, polymerization was carried out under the same conditions shown in Table 1, but the α,ω-nonconjugated diene was not used. The results are shown in Table 1. The Tan δ value showing the vibration-damping performance was small.

Comparative Example 2

In Example 5, polymerization was carried out under the same conditions shown in Table 1, but the α,ω-nonconjugated diene was not used. The results are shown in Table 1. The Tan δ value showing the vibration-damping performance was small.

Comparative Example 3

Copolymerization of 4-methyl-1-pentene and hexene was carried out without the use of α,ω-nonconjugated diene as the monomer. The results are shown in Table 1. It was found that crystallinity was lower, and that, although the vibration-damping performance was superior, the performance under a high temperature was not good at a low Tg.

TABLE 1

| | Amount of Catalyst used | | | Polymerization Condition | | | | | |
| | | | | Amount of Monomer used | | | | | |
| No. | Ti component (a) (mmol) | Triethylaluminum (mmol) | Trimethylmethoxysilame (mmol) | α-olefin (ml) | α,ω-Nonconjugated diene (ml) | Straight α-olefin (ml) | Polymerization | | |
| | | | | | | | Amount of H$_2$ added (ml) | Temp. (°C.) | Time (min) |
|---|---|---|---|---|---|---|---|---|---|
| Example 1 | 0.005 | 1 | 1 | 4-Methyl-1-pentene 500 | 1,5-Hexadiene 4.9 | — | 1000 | 50 | 12 |
| Example 2 | 0.005 | 1 | 1 | 4-Methyl-1-pentene 500 | 1,5-Hexadiene 7.4 | — | 1000 | 50 | 30 |
| Example 3 | 0.02 | 2 | 2 | 4-Methyl-1-pentene 500 | 1,5-Hexadiene 14.8 | — | 500 | 50 | 60 |
| Example 4 | 0.01 | 1 | 1 | 4-Methyl-1-pentene 500 | 1,5-Hexadiene 25.3 | — | 1000 | 70 | 10 |
| Example 5 | 0.005 | 1 | 1 | 4-Methyl-1-pentene 500 | 1,5-Hexadiene 2.5 | 1-Decene 9.4 | 1000 | 50 | 15 |
| Example 6 | 0.01 | 1 | 1 | 4-Methyl-1-pentene 500 | 1,7-Octadiene 23.6 | — | 1000 | 70 | 60 |
| Example 7 | 0.025 | 2.5 | 2.5 | 4-Methyl-1-pentene 500 | 1,7-Octadiene 49.4 | — | 1000 | 70 | 60 |
| Example 8 | 0.025 | 2.5 | 2.5 | 4-Methyl-1-pentene 500 | 1,6-Heptadiene 11.6 | — | 1000 | 80 | 3 |
| Comp. Example 1 | 0.005 | 1 | 1 | 4-Methyl-1-pentene 500 | — | — | 1000 | 50 | 30 |
| Comp. Example 2 | 0.005 | 1 | 1 | 4-Methyl-1-pentene 500 | — | 1-Decene 9.4 | 1000 | 50 | 30 |
| Comp. Example | 0.01 | 1 | 1 | 4-Methyl-1-pentene 500 | — | 1-Hexene 100 | 1000 | 70 | 30 |

TABLE 1-continued

| No. | Polymerization activity (g/mmol Ti) | Polymer composition | | [η] (dl/g) | Polymerization Result | | | | Density (g/cm³) | Iodine value | Acetone decane soluble (wt %) | Tm (°C.) | HAZE (%) |
|---|---|---|---|---|---|---|---|---|---|---|---|---|---|
| | | Content of α-olefin (wt %) | Diene content (wt %) | | Crystallinity Xc (%) | 20 + 0.83 Xc | Tg (°C.) | Tan δ | | | | | |
| Ex. 1 | 14,100 | 97.5 | 2.5 | 4.31 | 34 | 48 | 49 | 0.29 | 0.8360 | 0 | 0.52 | 214 | 3.0 |
| Ex. 2 | 15,100 | 96.9 | 3.1 | 4.74 | 28 | 43 | 49 | 0.33 | 0.8383 | 0 | 0.63 | 204 | 5.2 |
| Ex. 3 | 9,700 | 93.7 | 6.3 | 5.00 | 15 | 12 | 47 | 0.58 | 0.8487 | 0 | 0.71 | 170 | 17.6 |
| Ex. 4 | 5,900 | 87.9 | 12.1 | 2.49 | 0 | 20 | — | — | 0.8573 | 0 | 0.81 | — | 26.5 |
| Ex. 5 | 24,400 | 98.7*1 | 1.3 | 3.61 | 35 | 49 | 49 | 0.28 | 0.8346 | 0 | 0.33 | 208 | 4.8 |
| Ex. 6 | 780 | 88.0 | 12.0 | 1.65 | 20 | 37 | 43 | 0.31 | 0.8474 | 2 | 3.12 | 212 | 9.7 |
| Ex. 7 | 1,500 | 79.9 | 20.1 | 1.66 | 14 | 31 | 41 | 0.45 | 0.8565 | 3 | 3.26 | — | 16.5 |
| Ex. 8 | 4,100 | 92.5 | 7.5 | 2.94 | 30 | 45 | 55 | 0.37 | 0.8419 | 0 | 0.14 | 207 | 4.5 |
| Comp. Ex. 1 | 32,900 | 100 | — | 4.82 | 46 | 58 | 53 | 0.14 | 0.8308 | 0 | 0.05 | 242 | 4.2 |
| Comp. Ex. 2 | 39,200 | 100*2 | — | 5.33 | 39 | 52 | 48 | 0.25 | 0.8338 | 0 | 0.11 | 230 | 8.7 |
| Comp. Ex. 3 | 4,000 | 100*3 | — | 2.36 | 24 | 40 | 25 | 0.33 | 0.8389 | 0 | 2.43 | 181 | 9.4 |

*1: Containing 3.5 wt % of 1-decene
*2: Containing small amount of 1-decene
*3: Containing 1-hexane As specifically illustrated above, the α-olefinic random copolymer of the present invention has a relatively lower crystallinity compared with a homopolymer of a branched α-olefin, but has the specific features of a high glass transition temperature and excellent heat resistance, and shows a remarkable elimination of warping and sinking occurring during a melt molding such as an injection molding and extrusion molding. Further, the α-olefinic random copolymer of the present invention has a superior vibration-damping performance, particularly at a high temperature, and therefore, is suitable as a base material for vibration-damping materials.

We claim:

1. An α-olefinic random copolymer comprising: 70% to 99.9% by weight of a recurring unit (a) from a branched α-olefin having 5 to 10 carbon atoms, said branch at the 3-position or higher, and 0.1% to 30% by weight of a recurring unit (b) from an α,ω-nonconjugated diene having 6 to 20 carbon atoms, wherein said copolymer has:
   (i) an inherent viscosity [η], measured in decalin at 135° C., of from 0.5 to 10 dl/g;
   (ii) a crystallinity [Xc], measured by an X-ray diffraction method, of from 14% to 50%;
   (iii) a glass transition temperature of from 30° C. to 60° C.; and
   (iv) an iodine value of from 0 to 10.

2. The α-olefinic random copolymer as claimed in claim 1, further comprising 0 to 20% by weight of a recurring unit (c) from a straight-chain α-olefin having 2 to 20 carbon atoms.

3. A process for producing an α-olefinic random copolymer comprising copolymerizing a branched α-olefin having 5 to 10 carbon atoms, said branch at the 3-position or higher, and an α,ω-nonconjugated diene having 6 to 20 carbon atoms, in the presence of a catalyst comprising
   (A) a highly active and extremely stereoregular titanium catalyst component containing magnesium, titanium, a halogen, and an electron donor as the essential components;
   (B) an organic aluminum compound catalyst component; and
   (C) an electron donor; to form an α-olefinic copolymer comprising 70 to 99.9% by weight of a recurring unit (a) from said branched α-olefin and 0.1 to 70% by weight of a recurring unit (b) from said α,ω-nonconjugated diene having (i) an intrinsic viscosity, measured in decalin at 135° C., of from 0.5 to 10 dl/g, (ii) a crystallinity [Xc], measured by an X-ray diffraction method, of from 14% to 50%, (iii) a glass transition temperature [Tg] of from 30° C. to 60° C., and (iv) an iodine value of from 0 to 10.

4. A process for producing an α-olefinic random copolymer comprising copolymerizing a branched α-olefin having 5 to 10 carbon atoms, said branch at the 3-position or higher, an α,ω-nonconjugated diene having 6 to 20 carbon atoms and a straight-chain α-olefin having 2 to 20 carbon atoms in the presence of a catalyst comprising
   (A) a highly active and extremely stereoregular titanium catalyst component containing magnesium, titanium, a halogen, and an electron donor as the essential components;
   (B) an organic aluminum compound catalyst component; and
   (C) an electron donor; to form an α-olefinic random copolymer comprising 70 to 99.9% by weight of a recurring unit (a) from said branched α-olefin, 0.1 to 30% by weight of a recurring unit (b) from said α,ω-nonconjugated diene and 0 to 20% by weight of a recurring unit (c) from said straight-chain α-olefin having (i) an intrinsic viscosity [η], measured in decalin at 135° C., of from 0.5 to 10 dl/g, (ii) a crystallinity [Xc], measured by an X-ray diffraction method, of from 14% to 50%, (iii) a glass transition temperature [Tg] of from 30° C. to 60° C., and (iv) an iodine value of from 0 to 10.

* * * * *

UNITED STATES PATENT AND TRADEMARK OFFICE
CERTIFICATE OF CORRECTION

PATENT NO.  : 4,931,526

DATED       : June 5, 1990

INVENTOR(S) : YOSHITAKE, ET AL.

It is certified that error appears in the above-identified patent and that said Letters Patent is hereby corrected as shown below:

Column 17, line 49:
Claim 1, line 12, after "temperature", insert --[Tg]--.
Column 18, line 32:
Claim 3, line 18, after "viscosity", insert --[η]--.

Signed and Sealed this

Seventeenth Day of September, 1991

Attest:

HARRY F. MANBECK, JR.

Attesting Officer

Commissioner of Patents and Trademarks